United States Patent Office 3,494,693
Patented Feb. 10, 1970

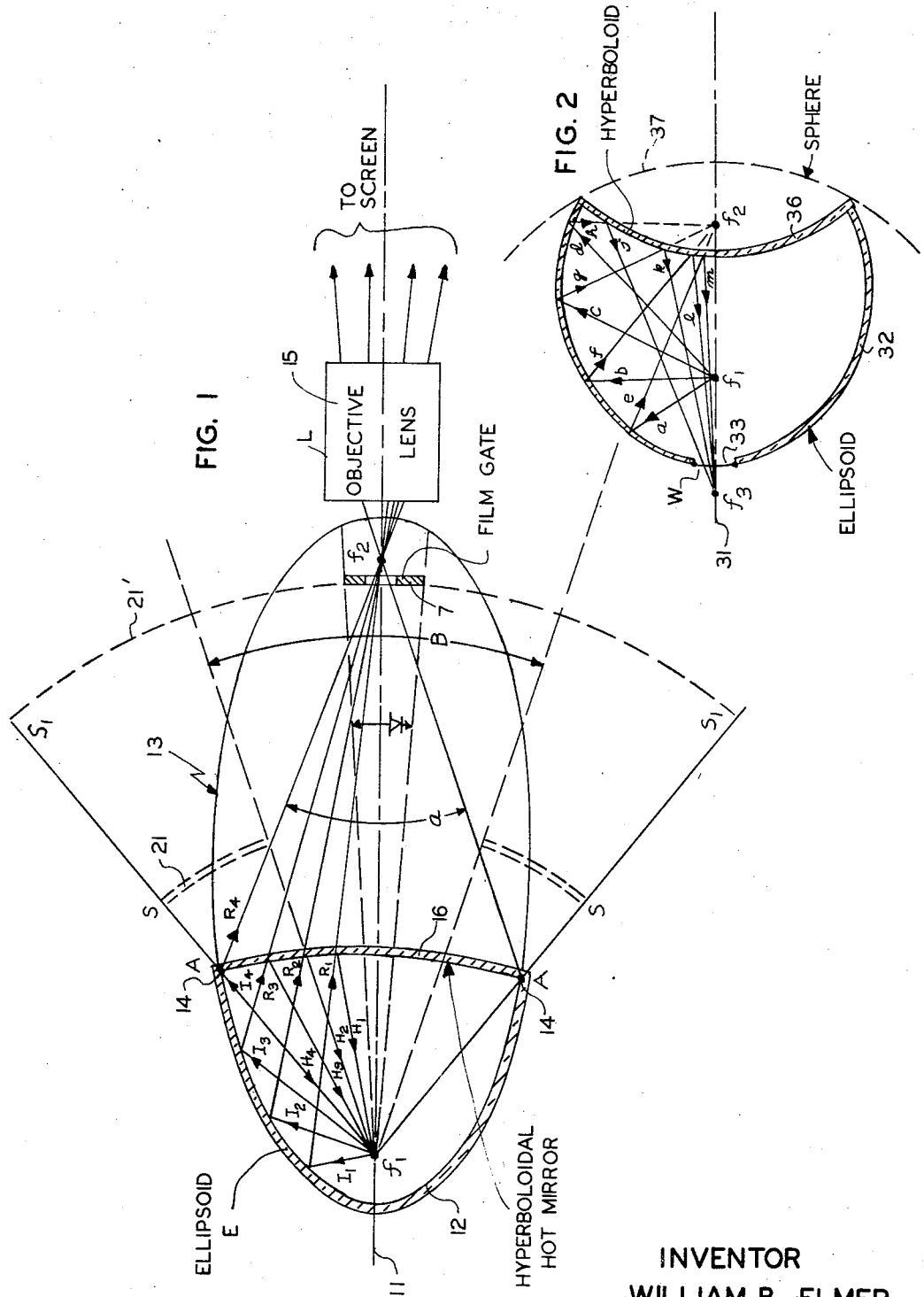

3,494,693
RADIANT ENERGY PROJECTION
William B. Elmer, 113 Pinckney St.,
Boston, Mass. 02114
Filed June 28, 1966, Ser. No. 561,212
Int. Cl. F21v 7/09
U.S. Cl. 353—55          6 Claims

ABSTRACT OF THE DISCLOSURE

A projection lamp system having reflecting surfaces defined by intersecting hyperbola-like curves and ellipse-like curves. The reflecting surfaces enclose a common focus and a light source is located at the common focus. The hyperbola-like curved reflector has a dichroic coating that allows light to pass through but reflects heat back to the projection lamp. The heating of the projection lamp improves efficiency by reducing the required electric power. Also the projection lamp system helps to keep the associated projection apparatus cooler than with conventional systems.

---

The present invention relates in general to radiant energy projection and more particularly concerns methods and means for efficiently projecting radiant energy from a source thereof within a prescribed solid angle. A specific form of the invention is especially useful in connection with optical projection apparatus for transmitting considerable useful optical energy with the least practicable electric consumption and a minimum of heating of the projection apparatus.

According to the invention, first reflecting means of cross section defined by at least a portion of an ellipse or quasi-ellipse is arranged with second reflecting means having a cross section defined by at least a portion of an hyperbola or quasi-hyperbola with the curves having a common axis and at least one common focus. According to another aspect of the invention, the first and second reflecting means have two common foci. According to still another aspect of the invention, one of the reflecting means is dichroic, this typically being the second reflecting means. A projection system according to the invention includes a radiant energy source, such as a projection lamp, embracing at least one common focus.

Conventional projection illumination systems typically employ high intensity lamps embracing the focal point of ellipsoidal or spherical reflectors. With ellipsoidal reflectors, the light source is located at one focus, $f_1$, with the ellipsoidal reflector reflecting rays emanating from the focus, $f_1$, toward the conjugate focus, $f_2$. Typically a film gate for accommodating a frame with an image to be projected is located close to but on the light source side of the conjugate focus, $f_2$. An objective lense separated from the film gate by the conjugate focus comprises means for projecting the image on the film to the viewing screen which such means separates from the film gate.

In such conventional projection illuminating systems practical considerations prevent the ellipsoidal reflector from extending beyond a prescribed distance toward the film gate because the beam of light received by the objective lens is not capable of usefully receiving light outside a limiting acceptance solid angle, $a$, of the objective lens. The cone of light ($s_1$–$f_1$–$s_1$, FIG. 1, infra) emitted by the lamp through the acute solid angle defined by radii emanating from the first focus through the edge of the ellipsoidal reflector is thus not only wasted (except for a tiny, negigible amount V FIG. 1, infra) but also contributes to undesired heating of the projecting apparatus.

In some extant projection lamps an additional spherical reflector is included to capture a portion of the light directed wastefully outside the reflected beam and return it to the source embracing the first focus, $f_1$, where this returned energy can reheat the source, pass through it to some degree and be re-reflected off the source. This spherical reflector is usually formed with an aperture bounding a solid angle, a, subtended by reflected rays converging toward the second focus, $f_2$. That portion of the light from $f_1$ initially passing through this aperture designated as solid angle, B, is still wasted.

Accordingly, it is an important object of this invention to reduce waste of radiant energy emanating from a source thereof that is to be directed for useful purposes.

It is another object of the invention to achieve the preceding object while reducing undesired heating of an associated radiant energy projection system.

It is still a further object of the invention to achieve the preceding objects with a relatively compact structural arrangement that may be fabricated relatively easily and relatively inexpensively.

Numerous other features, objects and advantages of the invention will become apparent from the following specification when read in connection with the accompanying drawing in which:

FIG. 1 is a diagrammatic representation of a preferred system according to the invention; and FIG. 2 is a diagrammatic representation of a reflecting system according to the invention for focusing a large portion of the total emission of a radiant energy source toward an open focus, $f_3$, external to the reflecting system.

With reference now to the drawing and more particularly FIG. 1 thereof, there is shown a diagrammatic representation of a system according to the invention. So as not to obscure the principles of the invention, the system is illustrated two dimensionally. Typically, the lens and reflectors exhibit circular symmetry about the axis joining the focus, $f_1$, and its conjugate, $f_2$. The principles would also be applicable to cylindrical systems employing trough reflecting surfaces with the radiant energy source then usually embracing a focal line, the cross section of the trough reflectors being represented by the illustrated curves.

A typical projection system comprises a projection lamp embracing the first focus, $f_1$, along the axis 11. The lamp itself is not shown, thereby making it easier to understand the ray paths indicated. An ellipsoidal reflector 12 has its cross section defined by a portion of the ellipse 13, ellipse 13 having one focus, $f_1$, and a conjugate focus, $f_2$, along axis 11. Preferably, the edge 14 of reflector 12 subtends both the solid angle A–$f_1$–A with vertex at the focus, $f_1$, and the smaller solid angle, $a$, with vertex $f_2$. The angle, $a$, corresponds to the acceptance angle of the objective lens 15.

The opening of reflector 12 may be covered by a hyperboloidal hot mirror surface 16 defined by an hyperbola having a focus at $f_1$. Being coated with well known dichroic hot mirror coatings and being confocal with the ellipsoidal reflector 12, this surface reflects incident heat rays, such as $H_1$, $H_2$, $H_3$, $H_4$ back along paths, such as $R_1$, $R_2$, $R_3$ to the reflecting surface 12 and then along paths such as $I_1$, $I_2$, $I_3$ to the original source embracing focus, $f_1$. Heat rays originally emanating from the source embracing focus $f_1$ and reflected by reflecting surface 12 toward the conjugate focus $f_2$ are also reflected directly back along $H_1$, $H_2$, $H_3$, $H_4$ toward the source. Thus, most of the heat rays originating in the source embracing focus $f_1$ are returned to that source. Such reheating of the source both appreciably reduces the electric power required to energize the source and also prevents the escape of much heat from the lamp, thereby keeping the associated projection apparatus cooler than with conventional systems. Meanwhile, the visible rays pass unimpaired through the hot mirror surface 16 to provide the desired illumination of the film in film gate 17.

According to still another aspect of the invention it is possible to retain the apertured spherical reflector 21 used in prior art systems. However, with the present illustrated embodiment, only visible radiation is primarily caught and returned by the spherical reflector 21 because the other radiation wave-lengths have already been removed from the beam by the hot mirror surface 14 before reaching the spherical reflector 21.

Referring to FIG. 2, there is shown a combination of reflecting surfaces according to the invention in which the apparatus functions to focus a large portion of the total emission of a radiant energy source toward a third focus, $f_3$, external to the reflecting system. This embodiment of the invention comprises a reflector 32 whose cross section is defined by an ellipse having a first focus, $f_1$, on axis 31 and a second focus, $f_2$, on axis 31 and formed with a small aperture 33 surrounding axis 31. A second reflecting surface 36 whose cross section is defined by an hyperbola having a first focus corresponding to the second focus of the elliptical reflector 32, $f_2$, and a second focus, $f_3$, on the axis 31 coacts with reflector 32 to enclose the volume including the source embracing the first focal point, $f_1$, whereby the focus, $f_3$, is outside this enclosed volume. Again the radiant energy source embracing the first focus, $f_1$, is not shown so as to avoid obscuring the principles of the invention.

Rays, such as $a$, $b$, $c$ and $d$, emanate from this source and are incident upon the elliptical reflector 32 for reflection toward the second focus, $f_2$, these reflected rays being designated $e$, $f$, $g$ and $h$, respectively. The hyperbolic reflecting surface 36 is arranged to intercept the rays, such as $e$, $f$, $g$ and $h$ and reflect them a second time toward the hyperbolic second focus, $f_3$, along paths such as $j$, $k$, $l$ and $m$, respectively, through opening 33. If the solid angle, Z, to $f_1$ subtended by the aperture 33 equals the solid angle subtended by the hyperbolic reflecting surface edges to $f_3$, direct and reflected beams will be congruent.

While a single elliptical reflector with foci at $f_1$ and $f_3$ could also collect radiation from $f_1$ and concentrate it at $f_3$, such a reflector would necessarily have to enclose focal point $f_3$ in order to approach the efficiency of the structure shown in FIG. 2, thereby mechanically interfering with materials or articles there located. With the present invention, efficient concentration along the external focus is achieved without mechanically interfering with the focus. The invention is thus useful for soldering or welding apparatus where spot illumination of high intensities is desired.

The arrangement of FIG. 2 is also especially useful where stray radiation is objectionable and must be virtually entirely inhibited. This arrangement efficiently provides a concentrated spot of radiant energy of high intensity with extremely low stray radiation and minimum aperture size.

If the arrangement of FIG. 2 is for illumination, one or both of the elliptical reflector 32 and the hyperbolic reflector 36 may be made with cold mirror surface coatings, allowing the heat rays to pass therethrough without being reflected to focus $f_3$. By adding a spherical reflector 37 centered on focus $f_1$, heat passing through reflector surface 36 would be reflected back to focus $f_1$ to help heat the source, thereby further enhancing the overall efficiency of the illumination system.

Systems according to the invention have a number of advantages. An exceptionally high percentage of the radiation emanating from the source at focus $f_1$ is usefully employed. In the system of FIG. 1 only those visible rays directed through the small solid annular angular volume corresponding to the difference between the solid angles B (subtended by the aperture of the spherical reflector 21) and the angle V (subtended by the film gate 17) are not utilized. The result is an illuminating system of exceptionally high efficiency with a minimum of heating of the projecting system and emission of but a slight amount of stray light. This efficiency can be increased further by displacing the spherical reflecting surface 21 to the position 21' at a radial distance from focus $f_1$ corresponding to the film gate 17 and with its aperture corresponding to that of the film gate aperture to achieve nearly perfect efficiency. From the practical standpoint the improvement in efficiency using the elliptical and hyperbolic reflectors is so great that the spherical reflectors may be omitted without excessive losses to achieve a smaller more compact source. The invention is especially suited for applications using reflector lamps in which the projection lamp envelope is shaped and coated as described, thereby eliminating separate external reflectors.

It should also be noted that the principles of the invention are applicable to a less precise extent to combinations including one or more of quasi-elliptical and quasi-hyperbolic reflecting surfaces having isoradiant characteristics of the type described in copending application Ser. No. 512,042, filed Dec. 3, 1965.

It is evident that those skilled in the art may now make numerous modifications and uses of and departures from the specific embodiments described herein without departing from the inventive concepts. Consequently, the invention is to be construed as limited solely by the spirit and scope of the appended claims.

What is claimed is:

1. Radiant energy projection apparatus comprising:
   first reflecting means of cross section defined by an ellipse-like curve,
   second reflecting means of cross section defined by an hyperbola-like curve,
   said ellipse-like curve and said hyperbola-like curve having a common axis and at least one common focus,
   said first and second reflecting means intersecting to substantially enclose said at least one common focus with at least said second reflecting means being free of apertures embracing the axis about which said ellipse-like and hyperbola-like curves are symmetrical,
   a light source located at said common focus and being enclosed by said first and second reflecting means,
   said first reflecting means directing light energy from said source to an object to be illuminated while directing a substantial portion of the heat energy away from said object back to said source,
   said second reflecting means being made of dichroic material and transmitting most of the light energy from said source to said object being illuminated while directing a substantial portion of the heat energy back to said source.

2. Radiant energy projection apparatus in accordance with claim 1 and further comprising said object to be illuminated,
   the latter object being translucent,
   and lens means for focusing light rays passing through said object upon a screen to image said object upon said screen.

3. Radiant energy projection apparatus in accordance with claim 1 wherein said second reflecting means has an outside focus on said common axis outside said volume,
   and further comprising means defining an aperture in said first reflecting means embracing said common axis to define ray paths from said outside focus to said second reflecting means whereby said first and second reflecting means coact to concentrate radiant energy from said source upon said outside focus.

4. Radiant energy projection apparatus in accordance with claim 3 wherein the angle with vertex at said outside focus subtended by said aperture is substantially the same as the angle with vertex at said outside focus subtended by said second reflecting means.

5. Radiant energy projection apparatus comprising:
first reflecting means of cross section defined by an ellipse-like curve,
second reflecting means of cross section defined by an hyperbola-like curve,
said ellipse-like curve and said hyperbola-like curve having a common axis and at least one common focus,
said second reflecting means being dichroic,
wherein said second reflecting means has an outside focus on said common axis outside a volume substantially enclosed by said first and second reflecting means,
and further comprising means defining an aperture in said first reflecting means embracing said common axis to define ray paths from said outside focus to said second reflecting means.

6. Radiant energy projection apparatus in accordance with claim 5 wherein the angle with vertex at said outside focus subtended by said aperture is substantially the same as the angle with vertex at said outside focus subtended by said second reflecting means.

References Cited

UNITED STATES PATENTS

| | | | |
|---|---|---|---|
| 3,174,067 | 3/1965 | Bahrs | 353—55 XR |
| 2,026,478 | 12/1935 | Lisintzki. | |
| 2,852,980 | 9/1958 | Schroder | 240—47 |
| 3,288,989 | 11/1966 | Cooper | 240—47 XR |

FOREIGN PATENTS 229,039  2/1925  England.

NORTON ANSHER, Primary Examiner

R. P. GREINER, Assistant Examiner

U.S. Cl. X.R.

240—47, 41.35